US 9,762,446 B2

United States Patent
Xu et al.

(10) Patent No.: US 9,762,446 B2
(45) Date of Patent: Sep. 12, 2017

(54) METHODS FOR DYNAMIC SERVICE DEPLOYMENT FOR VIRTUAL/PHYSICAL MULTIPLE DEVICE INTEGRATION

(71) Applicant: Futurewei Technologies, Inc., Plano, TX (US)

(72) Inventors: Jun Xu, Cupertino, CA (US); Guang Zhao, Nanjing (CN)

(73) Assignee: Futurewei Technologies Co., Ltd., Plano, TX (US)

( * ) Notice: Subject to any disclaimer, the term of this patent is extended or adjusted under 35 U.S.C. 154(b) by 609 days.

(21) Appl. No.: 13/730,296

(22) Filed: Dec. 28, 2012

(65) Prior Publication Data

US 2014/0185488 A1 Jul. 3, 2014

(51) Int. Cl.
*H04L 12/24* (2006.01)
*H04L 12/931* (2013.01)
*H04L 12/773* (2013.01)

(52) U.S. Cl.
CPC ............ *H04L 41/12* (2013.01); *H04L 45/60* (2013.01); *H04L 49/00* (2013.01)

(58) Field of Classification Search
CPC .......... H04L 41/12; H04L 49/00; H04L 49/70
USPC ........................................................ 370/255
See application file for complete search history.

(56) References Cited

U.S. PATENT DOCUMENTS

| | | | |
|---|---|---|---|
| 7,324,547 B1 | 1/2008 | Alfieri et al. | |
| 8,259,585 B1* | 9/2012 | S P ................. | H04L 45/125 370/237 |
| 2004/0028050 A1* | 2/2004 | Proctor .............. | H04Q 3/0045 370/395.1 |
| 2007/0266433 A1* | 11/2007 | Moore .................. | G06F 21/53 726/15 |
| 2008/0115192 A1* | 5/2008 | Kulkarni .............. | G06F 21/31 726/2 |
| 2010/0054260 A1* | 3/2010 | Pandey ................. | H04L 49/00 370/395.53 |

(Continued)

FOREIGN PATENT DOCUMENTS

CN 101193049 A 6/2008
CN 201160282 Y 12/2008

OTHER PUBLICATIONS

Foreign Communication From A Counterpart Application, PCT Application No. PCT/CN2013/090718, International Search Report dated Mar. 20, 2014, 6 pages.

(Continued)

*Primary Examiner* — Mark Rinehart
*Assistant Examiner* — Kenneth P Hunt
(74) *Attorney, Agent, or Firm* — Conley Rose, P.C.

(57) ABSTRACT

A method implemented in an integrated edge node for performing routing functions and network appliance services at the edge of a network, the method comprising disassociating a first network feature from a port, creating a plurality of first internal virtual ports, associating the plurality of first internal virtual ports to a first network appliance service component and a core unit component, mapping the plurality first internal virtual ports to each other and to a plurality of ports, constructing an internal path comprising at least one port, a subset of the plurality of internal virtual ports, the network appliance service component, and the core unit component, and associating the first network feature to the internal path.

20 Claims, 7 Drawing Sheets

(56) References Cited

U.S. PATENT DOCUMENTS

| | | | |
|---|---|---|---|
| 2010/0246594 A1 | 9/2010 | Klinglesmith et al. | |
| 2010/0299741 A1* | 11/2010 | Harrison | H04L 63/0281 726/12 |
| 2010/0312913 A1* | 12/2010 | Wittenschlaeger | G06F 9/54 709/238 |
| 2012/0082163 A1* | 4/2012 | Esteve Rothenberg | H04L 45/00 370/392 |
| 2012/0131466 A1* | 5/2012 | Bugenhagen | G08B 25/08 715/733 |
| 2014/0181319 A1* | 6/2014 | Chen | H04L 47/33 709/234 |
| 2014/0185488 A1* | 7/2014 | Xu | H04L 41/12 370/255 |
| 2015/0071110 A1* | 3/2015 | Kothari | H04L 41/0663 370/254 |
| 2016/0072669 A1* | 3/2016 | Saavedra | H04L 12/2867 709/220 |
| 2016/0149784 A1* | 5/2016 | Zhang | H04B 1/0003 370/229 |

OTHER PUBLICATIONS

Foreign Communication From A Counterpart Application, PCT Application No. PCT/CN2013/090718, Written Opinion dated Mar. 20, 2014, 3 pages.

"Cisco Wide Area Application Services on Cisco Services Ready Engine Modules for Cisco Integrated Services Routers Generation 2", Cisco, 2010.

"HP ApplianceONE Extened SErvices zl Module with Riverbed Steelhead RiOS Application" Installation and Getting Started Guide, Hewlett-Packard Development Company, L.P., Oct. 2010.

"Riverbed Services Platform—Riverbed Services Platform and Virtual Services Platform (RSP/VSP)", Riverbed Technology, http://www.riverbed.com/us/products/steelhead_appliance/rsp.php. 2012.

\* cited by examiner

METHODS FOR DYNAMIC SERVICE DEPLOYMENT FOR VIRTUAL/PHYSICAL MULTIPLE DEVICE INTEGRATION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A modern communication and data network may comprise network edge nodes, such as routers and other devices that interface with one or more other networks. Each network edge node may provide one or more network interfaces (e.g. ingress and egress ports) that transport data from one network to another network. The network interfaces may be configured to provide a variety of network features that may include, Access Control List (ACL), Quality of Service (QoS), Internet Protocol Security (IPsec), accounting, deep packet inspection (DPI) and tunneling. Network edge nodes may also be externally coupled to a variety of network appliances that provide different network services (e.g. Firewall) that enhance network performance and security. However, connecting and managing the multiplitude of network edge nodes and the assortment of external network appliances associated with each network edge node has seriously complicated Information Technology (IT) operations within a network.

One design option to reduce network complexity is to minimize the number and network appliances externally coupled to network edge nodes by integrating the network edge nodes and network appliances into an integrated edge node. Integrated edge nodes no longer need to rely on externally coupled network appliance to implement a service. For instance, an network appliance module may be attached to a network edge node to form an integrated edge node that may not only perform the routing functions found in a network edge node, but may also provide a network appliance service, such as Wide Area Application Services (WAAS). As a result, operators no longer need to externally couple and configure a network appliance to an integrated edge node already configured to provide the network service.

Although current integrated edge nodes may reduce network complexity, both integrated edge nodes and coupling external network appliances lack the ability to dynamically create data paths between network appliances and network edge nodes. When network appliances and network edge nodes are externally coupled, physical links fix the data paths between the two different types of nodes. For example, a network appliance may be externally coupled between a core network node and a network edge node. Data traffic traveling from the core network node must initially travel on a fixed path through the network appliance before reaching the network edge node. In this scenario, the data traffic may not be rerouted such that the network edge node receives the data traffic before the network appliance. Fixed data paths also exists for integrated edge nodes because the internal network appliances and internal network edge nodes are physically connected to each other.

Additionally, current configurations of integrated edge nodes and externally coupled network appliances lack the flexibility of dynamically applying network features (e.g. ACL) at the edge of a network. At the edge of a network, network edge nodes are configured to apply network features at the physical interfaces of network edge nodes, and thus the location of the network edge node fixes where a network may apply a network feature. Unfortunately, a network appliance service may require some network features (e.g. DPI, ACL, and accounting) to be implemented before applying the network appliance service, while other network features need to be implemented afterwards (e.g. QoS and IPsec). Thus, new technology is necessary to improve traffic routing and network feature flexibility at the edge of a network.

SUMMARY

In one embodiment, the disclosure includes an integrated edge node for performing routing functions and network appliance services at the edge of a network, comprising an integrated edge node for performing routing functions and network appliance services at the edge of a network, comprising, a plurality of ports, and a processor configured to detach a plurality of network features from the plurality of ports, create a plurality of first internal virtual ports that are associated with a plurality of internal components within the integrated edge node, construct an internal topology of the integrated edge node by linking the first internal virtual ports amongst each other, construct an internal path using the internal topology, and associate a first network feature to the internal path.

In yet another embodiment, the disclosure includes an integrated edge node for performing routing functions and network appliance services at the edge of a network, comprising a first network appliance component configured to provide a network appliance service, a plurality of first internal virtual ports associated with the first network appliance component, a core unit component configured to provide a routing function, a plurality of second internal virtual ports associated with the core unit, and a plurality of ports, wherein the plurality of first internal virtual ports, the plurality of second internal virtual ports, and the plurality of ports are mapped to each other to interconnect the first network appliance, the core unit, and the plurality of ports, wherein a first network feature is decoupled from a first port, wherein the first network feature is associated with an internal path, and wherein the internal path overlaps at least one port, at least one virtual port, the first network appliance component, and the core unit.

In a third embodiment, the disclosure includes a method implemented in an integrated edge node for performing routing functions and network appliance services at the edge of a network, the method comprising disassociating a first network feature from a port, creating a plurality of first internal virtual ports, associating the plurality of first internal virtual ports to a first network appliance service component and a core unit component, mapping the plurality of first internal virtual ports to each other and to a plurality of ports, constructing an internal path comprising at least one port, a subset of the plurality of internal virtual ports, the network appliance service component, and the core unit component, and associating the first network feature to the internal path.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques described below, including the exemplary designs and implementations illustrated and described herein, but may be modified within the scope of the appended claims along with their full scope of equivalents.

Disclosed herein are a method, apparatus, and system that integrates routing, switching, and server functions with network appliance services into an integrated edge node. The integrated edge node may map a plurality of internal virtual ports that dynamically link physical ingress and/or egress ports with internal network appliance components and the internal core unit component. The internal topology may be dynamically modified to remove or include additional network appliance components for the integrated edge node. The integrated edge node may be configured to create one or more internal paths that may transport data via the internal virtual ports, physical ingress and/or egress ports, internal network appliance components, and/or internal core unit components. One or more network features may be detached from an ingress and/or egress port and be associated with an internal path that overlaps the ingress and/or egress port. Each internal path may be associated with one or more network features that may be enforced at any juncture along the internal path. The location of the enforcement point may be implicitly or explicitly managed by an administrator or determined using predefined rules.

Figure 1:
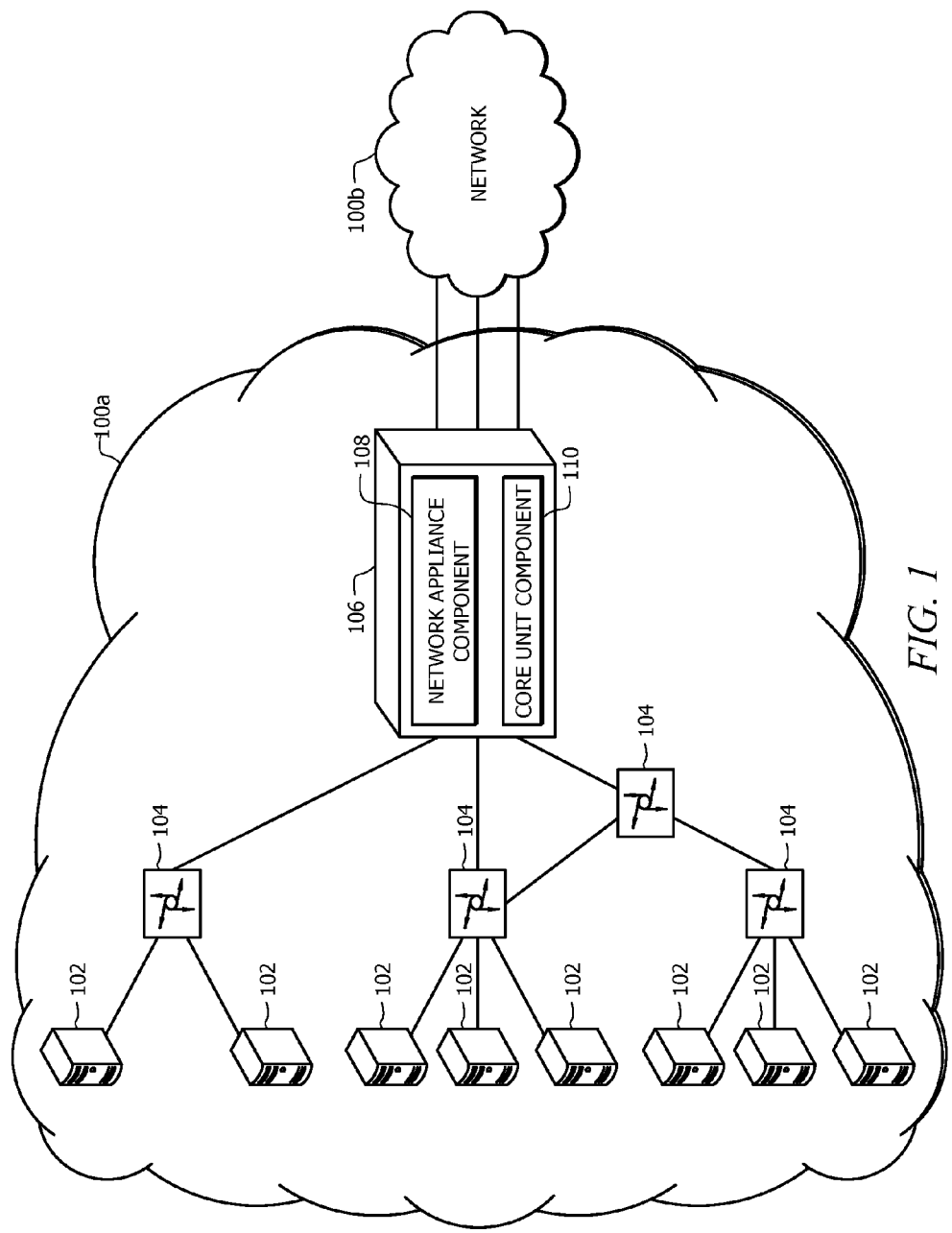
FIG. 1 is a schematic diagram of an embodiment of a network system that uses an integrated edge node to provide communication between two different networks.

FIG. 1 is a schematic diagram of an embodiment of a network system that uses an integrated edge node to provide communication between two different networks 100a and 100b, which may be collectively referred to as networks 100. Networks 100 may be any network that transports data, such as Internet Protocol (IP) networks, Multiprotocol Label Switching (MPLS) networks, and Ethernet networks. Networks 100 may be a network comprising one or more local area networks (LANs), metropolitan area networks (MANs), and/or wide area networks (WANs). Networks 100 may include, but not limited to hard-wired networks, wireless networks, and virtual networks that may operate in the electrical, optical, or a combination of both domains. Networks 100 may offer data services that forward data from one end node 102 to another end node 102 without using pre-configured routes. Another embodiment of networks 100 may forward data from end node 102 to another end node 102 across the network along pre-configured or pre-established paths.

Networks 100 may comprise at least one of the following groups: end node 102, core network nodes 104, and integrated edge node 106. End node 102 may include hosts, servers, storage devices, or other types of end devices that may originate data into or receive data via networks 100. End nodes 102 may be coupled to core network nodes 104 within network 100a. Core network nodes 104 may include routers, switches, bridges, and any other devices used to transport data within network 100a. In addition to end nodes 102, core network nodes 104 may also be coupled to other core network nodes 104 and integrated edge node 106. FIG. 1 illustrates that the integrated edge node 106 may be located at the edges of a network and may be used to transport data from network 100a to network 100b and vice versa.

Integrated edge node 106 may comprise a network appliance component 108, a core unit component 110, and a plurality of ingress and egress ports. The network appliance component 108 may be capable of hosting one or more network appliance services such as firewall, WAAS, Active Directory, and load balancing. The network appliance component 108 may function separately from the core unit component 110. The core unit component 110 may provide routing, switching, and server functions used to transport data. The plurality of ingress and egress ports may be configured to interface with different types of networks that include, but are not limited to Ethernet networks, T-carrier systems, E-carrier systems, wireless fidelity (WIFI) networks, Passive Optical Networks (PON), and Packet over Synchronous Optical Networking (SONET) (POS) networks. Construction of the internal topology of the integrated edge node 106 will be discussed in more detail below.

Figure 2:
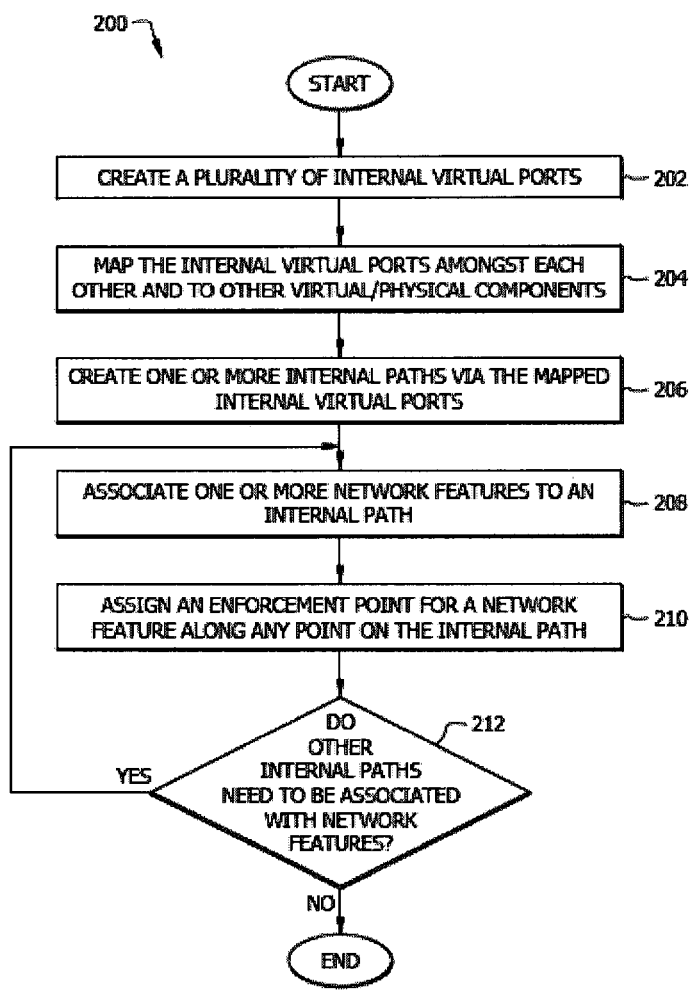
FIG. 2 is a flowchart of an embodiment of a method that dynamically creates the internal topology and paths of the integrated edge node and applies network features along the paths.

FIG. 2 is a flowchart of an embodiment of a method 200 that dynamically creates the internal topology and paths of the integrated edge node and applies network features along the paths. Method 200 may be used to initially create an internal topology within the integrated edge node based on the components specified by an operator. Method 200 may also be used to dynamically modify an existing internal topology when network appliance components are added or removed within the integrated edge node. In addition to topology creation, method 200 may also associate network features to internally created paths. The enforcement point of the network features may be along any point of the internal paths.

Method 200 starts at block 202 and creates a plurality of internal virtual ports. The internal virtual ports may be created in a variety of methods well known to a person of ordinary skill in the art (e.g. manual creation of virtual ports using a Linux® platform). The virtual ports may be associated with different internal components, such as virtual and/or physical devices, within the integrated edge node. For example, in FIG. 1, the network appliance component 108 may be associated with a set of virtual ports (e.g. virtual port 1 and virtual port 2), while the core unit component 110 may be associated with a different set of virtual ports (e.g. virtual port 3 and virtual port 4). The number of created virtual ports, and the association of virtual ports to internal components (e.g. virtual and/or physical devices) within the integrated edge node may vary depending on the desired internal topology.

Afterwards, method 200 proceeds to block 204 and maps the virtual ports to other virtual ports and/or other components within the integrated edge node. The mapping process in block 204 may produce an internal topology by linking the virtual ports to other virtual ports. As discussed in block 202, the virtual ports may be associated with different components within the integrated edge node. Thus, by mapping the different virtual ports, different components within the integrated edge node may be linked together. Using FIG. 1 as an example, method 200 may connect an ingress port from integrated edge node 106 to the network appliance component 108 by mapping the ingress port to a virtual port associated with network appliance component 108. In addition, another virtual port associated to network appliance component 108 may be mapped to a virtual port associated to core unit component 110 to serially link the ingress port to the network appliance component 108, and to the core unit component 110. Persons of ordinary skill in the art are aware that a variety of internal topologies may be constructed using the same virtual ports created in block 202.

Method 200 may then move to block 206 after mapping the internal virtual ports. At block 206, method 200 creates one or more internal paths using the internal topology. The paths created may include ingress/egress ports, network appliance components, virtual ports, core unit components, or various combinations thereof. Method 200 continues to block 208 after creating the internal paths for the internal topology. At block 208, method 200 associates one or more network features for an internal path. In one embodiment, method 200 may disassociate the network features from one or more ingress and/or egress ports prior to associating the network features for the internal path. As discussed above, an edge node may apply a variety of network features (e.g. QoS) within integrated edge node. Block 208 may associate and apply the network features along a given internal path. In one embodiment, the network feature may be associated at the ingress port of the integrated edge node. Constructing internal paths and assigning network features along the internal path will be discussed in more detail in FIGS. 3-6.

Once network features are associated with an internal path, method 200 may proceed to block 210 and assign enforcement points for a network feature along the internal path. Method 200 may decouple the enforcement point from a fixed location and assign the enforcement point for network features along the internal path using predefined rules, such as preset manufacture settings within the integrated edge node, and/or configurations managed by an administrator's for the integrated edge node. Regardless of the approach used to assign enforcement points for network features, method 200 may designate the enforcement points along any juncture of the path. In one embodiment, the enforcement point may be located at the ingress and/or egress ports of the integrated edge node, while in another embodiment the enforcement point may be located at a logic enforcement point (e.g. virtual port) associated with the network appliance component and/or core unit component.

After assigning enforcement points, method 200 may proceed to block 212 and determine whether other internal paths have been associated with network features. If there are internal paths that have not yet been associated with network features, then method 200 may return to block 208 to associate network features for the internal path. However, if all the internal paths are associated with network features, then method 200 may end.

Figure 3:
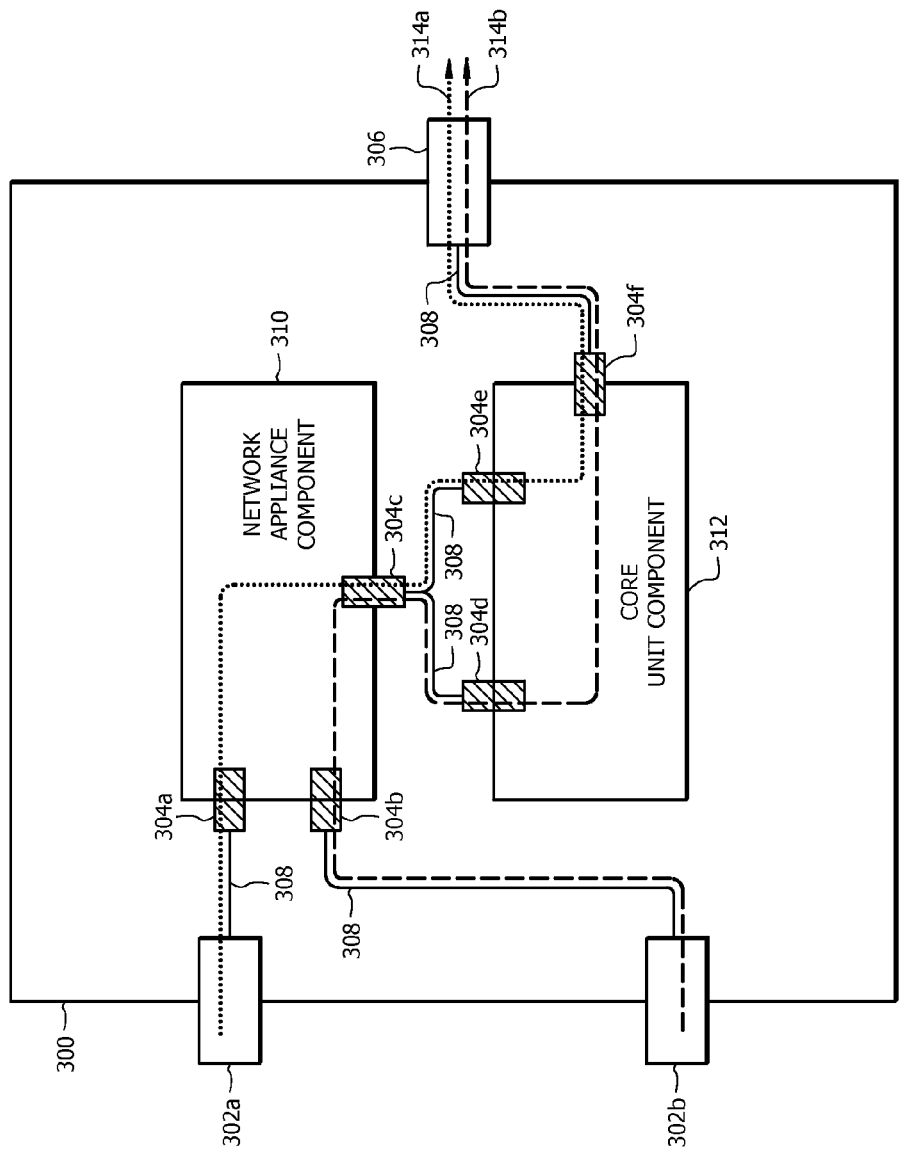
FIG. 3 is a schematic diagram of an embodiment of the internal topology for an integrated edge node that provides routing functions and appliance services.

FIG. 3 is a schematic diagram of an embodiment of the internal topology for an integrated edge node 300 that provides routing functions and appliance services. The integrated edge node 300 may comprise ingress ports 302, virtual ports 304, a network appliance component 310, a core unit component 312, and egress ports 306. Virtual ports 304 may be created and associated to the network appliance component 310 and the core unit component 312 as discussed for block 202 in method 200. As discussed above, the virtual ports may be mapped to other virtual ports and/or other internal components within the integrated edge node 300. FIG. 3 illustrates that virtual port 304a and 304b may be mapped to ingress ports 302a and 302b, respectively, while virtual port 304c may be mapped to virtual ports 304d and 304e. The mapping process as described in block 204 of method 200 may create links 308. Links 308 may be a virtual or logical connection that may be implemented using a single physical link, a series of physical links, and/or a plurality of interconnected internal components not shown in FIG. 3.

The mapping of ingress ports 302 and/or egress ports 306 to virtual ports 304 may be a one-to-one mapping. In a one-to-one mapping, the ingress ports 302 and/or egress ports 306 may be mapped or linked to only one virtual port 304. FIG. 3 illustrates a one-to-one mapping where ingress port 302a may be mapped to virtual port 304a and ingress port 302b may be mapped to virtual port 304b. Furthermore, virtual port 304f may be mapped to egress port 306. FIG. 3 depicts no other virtual ports mapped to ingress port 302a, 302b, and egress port 306. Another embodiment may map more than one virtual port to an ingress port 302 or egress port 306. A third embodiment may map more than one ingress port 302 or egress port 306 to a virtual port.

Ingress ports 302 may receive/forward data packets within the same network, while the egress ports 306 may receive/forward data packets to another network. For example, in FIG. 1, the ingress ports 302 may receive and/or forward data packets to core network node 104, while the egress ports 306 may receive and/or forward data packets to network 100b. In FIG. 3, the internal topology of the integrated edge node 300 may have the internal network appliance component 310 positioned between ingress ports 302 and the core unit component 312. Hence, the topology of the integrated edge node 300 positions the internal network appliance component 310 before the core unit component 312 in reference to ingress ports 302. Another embodiment for the internal topology of integrated edge node 300 may position the core unit component 312 between the ingress ports 302 and the internal network appliance component 310, and thus the internal network appliance component 310 may be positioned after the core unit component 312.

In FIG. 3, network appliance component 310 may be associated with virtual ports 304a, 304b, and 304c, while core unit component 312 may be associated with virtual ports 304d, 304e, and 304f. Persons of ordinary skill in the art are aware that the number of virtual ports associated with the network appliance component 310 and core unit component 312 may vary (e.g. more than or less than three virtual ports 304) depending on the desired internal topology of integrated edge node 300. In one embodiment, the network appliance component 310 may be an appliance card that provides one appliance service. For example, the network appliance component 310 may be configured to provide WAAS services. Other embodiments of the network appliance component 310 may include one or more appliance cards integrated to provide one more appliance services (e.g. WAAS, Firewall, and Active Directory).

Recall that the internal paths 314 may be constructed internally as described in block 206 of method 200. FIG. 3 illustrates two internal paths 314 that pass through the network appliance component 310 and the core unit component 312 via virtual ports 304a and links 308. The internal paths 314 may indicate the path an incoming data packet received at the ingress port 302 may travel through to be forwarded to the egress port 306. For example, an incoming data packet traveling via internal path 314a may enter the integrated edge node 300 at the ingress port 302b and may subsequently be forwarded to the network appliance component 310 via virtual port 304b. The network appliance component 310 may perform appliance services, such as WAAS, on the incoming data packet. Afterwards, the network appliance component 310 may forward the incoming data packet via virtual port 304c to the virtual port 304d of the core unit component 312. The core unit component 312 may perform routing/switching/server functions after receiving the incoming data packet and may later forward the incoming data packet to egress port 306 via virtual port 304f. FIG. 3 also depicts a second internal path 314b that forwards incoming data packets in the following sequence: from ingress ports 302a to virtual port 304a, to network appliance component 310, to virtual port 304c, to virtual port 304e, to core unit component 312, to virtual port 304f, and outputted at egress port 306. Although FIG. 3 illustrates that internal paths 314 may forward data from the ingress port 302 to egress port 306, other embodiments may have internal paths 314 forward data from the egress port 306 to ingress port 302.

As described in block 210 of method 200, enforcements locations for a network feature (e.g. QoS) may be established at any juncture along the internal path 314. Junctures along the internal path 314 may include the ingress port 302, network appliance component 310, core unit component 312, virtual ports 304, and egress port 306. In one embodiment, for internal path 314a, a network feature may be applied at the ingress port 302a or virtual port 304a, and thus may be applied before the network appliance component 310 receives and applies network appliance services to the incoming data packet. In another embodiment, the network feature may be applied after the network appliance component 310 applied network appliance services when the network feature are enforced at virtual ports 304d, 304f, or the egress port 306.

Assignment of enforcement locations may vary for different internal paths 314 and/or different network features along the same internal path 314. The same network feature (e.g. ACL) along different internal paths 314 may have different enforcement locations. For example, internal path 314a may establish the enforcement point at the ingress port 302a, while internal path 314b may establish the enforcement point at the virtual port 304b. Moreover, more than one network feature may be applied for an internal path 314. The enforcement points for the different network features may be at the same and/or different locations of an internal path 314. Using internal path 314a as an example, one network feature (e.g. ACL) may be applied at the ingress port 302a, while another network feature (e.g. QoS) may be applied at virtual port 304e. Conversely, within the same internal path 314a, network features ACL and DPI may be both enforced at the ingress port 302a.

Figure 4:
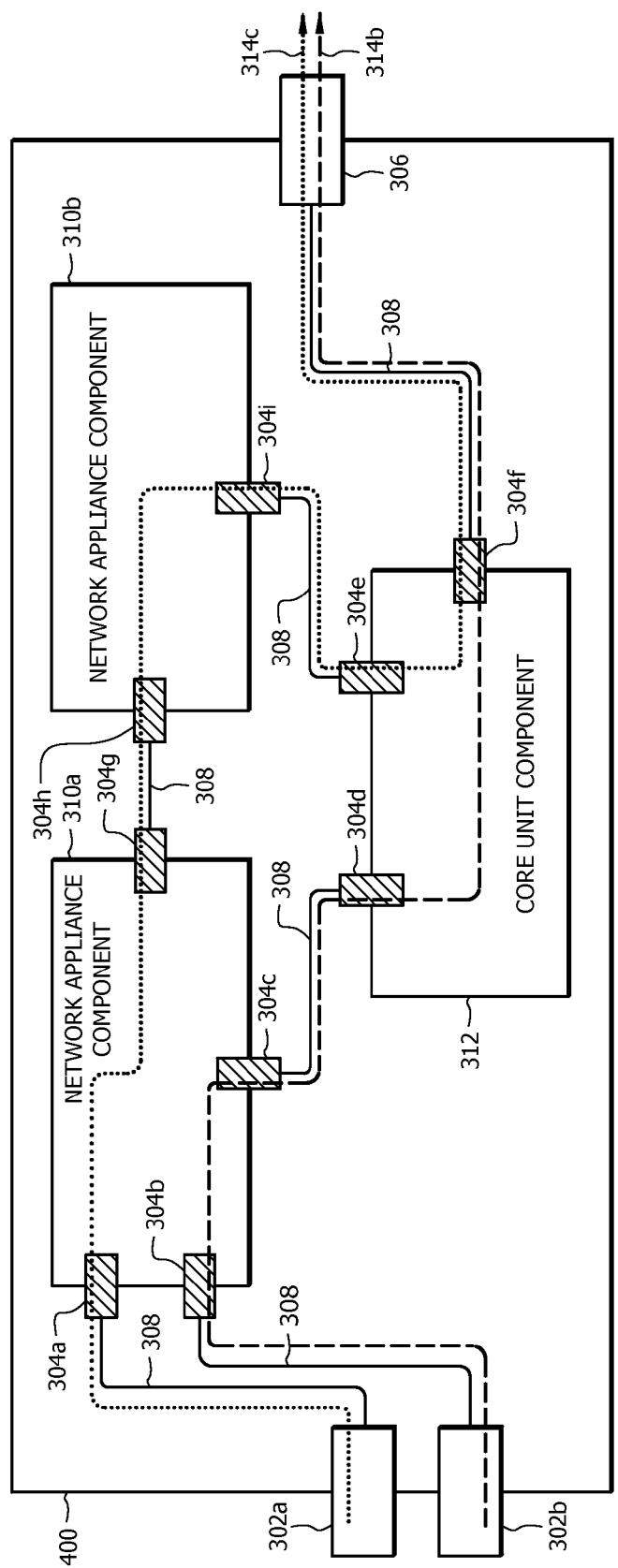
FIG. 4 is a schematic diagram of another embodiment of the internal topology for an integrated edge node that provides routing functions and appliance services.

FIG. 4 is a schematic diagram of another embodiment of the internal topology for an integrated edge node 400 that provides routing functions and appliance services. FIG. 3 may illustrate the initial internal topology of an integrated edge node 300. After establishing the initial topology, an additional network appliance component 310b may be dynamically added to the integrated edge node 300, and thus modifying the internal topology. As shown in FIG. 4, the topology of integrated edge node 400 may change with the additional network appliance components 310b.

FIG. 4 illustrates that network appliance component 310a may be serially linked to network appliance component 310b. In other words, data may travel from one network appliance component 310a to another network appliance component 310b prior to reaching the core unit component 312. In FIG. 4, an incoming data packet may travel from ingress port 302a along internal path 314c to network appliance component 310a. Instead of forwarding the data packet to the core unit component 312, the data packet may travel via virtual ports 304g and 304h to network appliance component 310b prior to being forwarded to the core unit component 312. Network appliance component 310b may forward the data packet to core unit component 312 via virtual port 304i. From the core unit component 312, the incoming data packet may travel to the egress port 306 via virtual port 304f. As shown in FIG. 4, the serially linked network appliance components 310 may be located between the ingress port 302 and the core unit component 31. Another embodiment of the internal topology of integrated edge node 400 may position the serially linked network appliance components 310 behind the core unit component 312.

Figure 5:
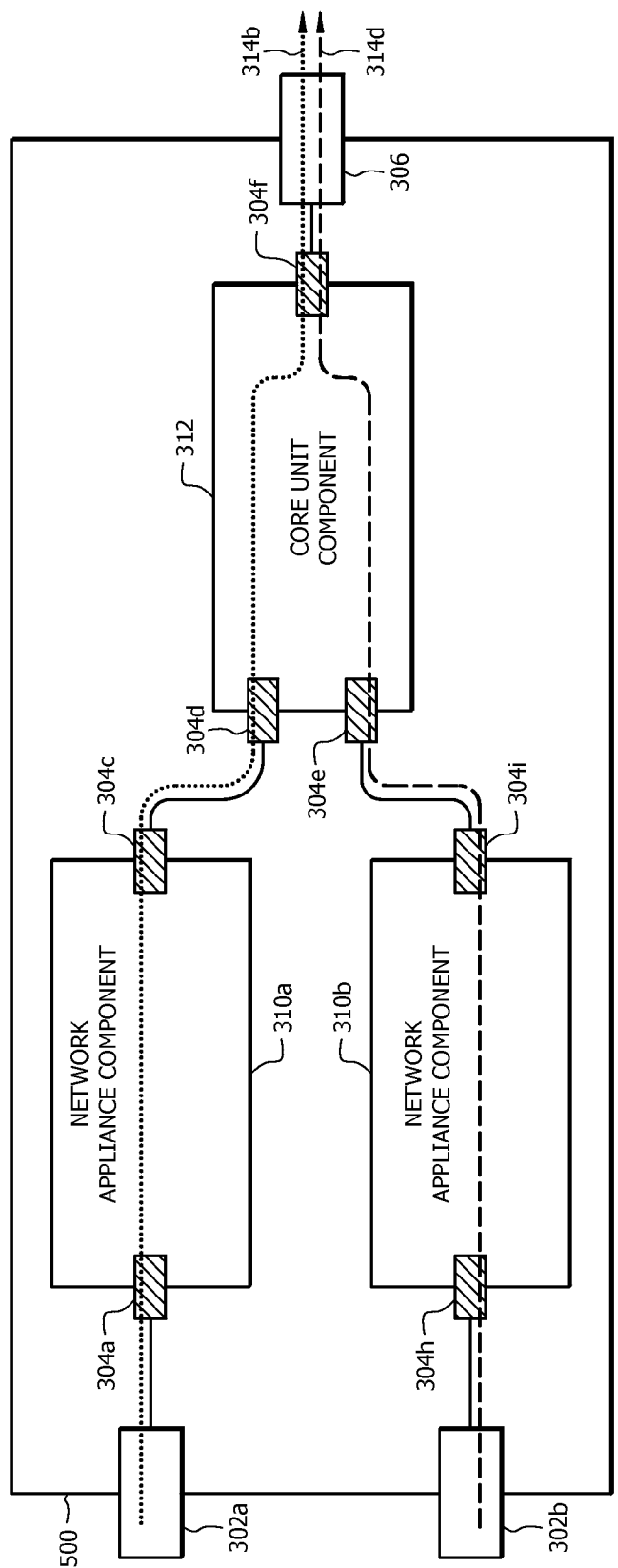
FIG. 5 is a schematic diagram of another embodiment of the internal topology for an integrated edge node that provides routing functions and appliance services.

FIG. 5 is a schematic diagram of another embodiment of the internal topology for an integrated edge node 500 that provides routing functions and appliance services. In contrast to the internal topology shown in FIG. 4, the internal topology of integrated edge node 500 may have the network appliance components 310 linked in parallel to the core unit component 312. Two network appliance components 310 may be linked in parallel when the network appliance components 310 are linked to the core unit component 312 independently of each other. In FIG. 5, the network appliance component 310a may be directly linked to core unit component 312 by mapping virtual port 304c to virtual port 304b. Internal path 314b, as described in FIG. 3, may provide a route that does not include network appliance component 310b. Network appliance component 310b may be directly linked to an ingress port 302b and core unit component 312, such that another internal path 314d provides a route that does not include network appliance component 310a. Internal path 314d may originate from ingress port 302b to virtual port 304h that is associated with network appliance component 310b. Internal path 314d may continue from network appliance component 310b to core unit component 312 via ports 304i and 304e. The internal path 314d may reach egress port 306 via virtual port 304f. Network appliance component 310a may forward incoming data packets to the core unit component 312 without first sending the data packets to network appliance component 310b and vice versa. In one embodiment, network appliance component 310a and/or network appliance component 310b may be serial linked to other network appliance components 310 not show in FIG. 5. Other embodiments of the topology integrated edge node 500 may position the core unit component 312 before the network appliance component 310 with respect to ingress port 302.

Figure 6:
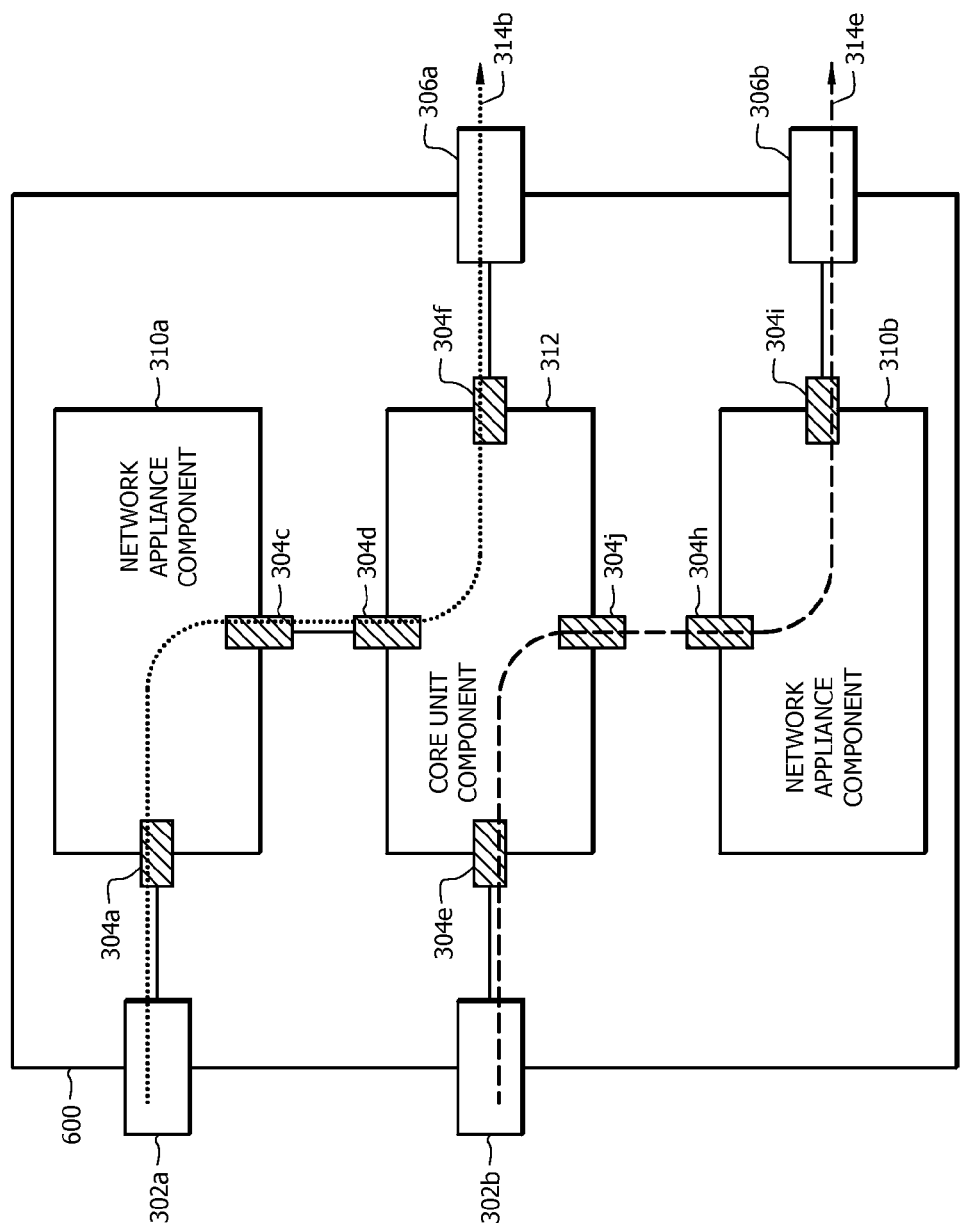
FIG. 6 is a schematic diagram of another embodiment of the internal topology for an integrated edge node that provides routing functions and appliance services.

FIG. 6 is a schematic diagram of another embodiment of the internal topology for an integrated edge node 600 that provides routing functions and appliance services. In FIGS. 4 and 5, the additional network appliance component 310*b* may be positioned and mapped before the core unit component 312. FIG. 6 illustrates that the topology of the integrated edge node 600 may position the additional network appliance components 310*b* after the core unit component 312. Network appliance component 310*a* may remain located before the core unit component 312, while network appliance component 310*b* may be placed after core unit component 312. Internal path 314*b* may transport data as described in FIG. 3, and internal path 314*e* may transport data from ingress port 302*b* to the core unit component 312, to network appliance component 310*b*, and outputted to egress port 306*b* via virtual ports 304*e*, 304*j*, 304*h*, and 304*i*. Other embodiments of the internal topology for an integrated edge node 600 may have the network appliance component 310*a* and 310*b* linked in parallel and/or in serial to other network appliance components 310 not shown in FIG. 6.

Figure 7:
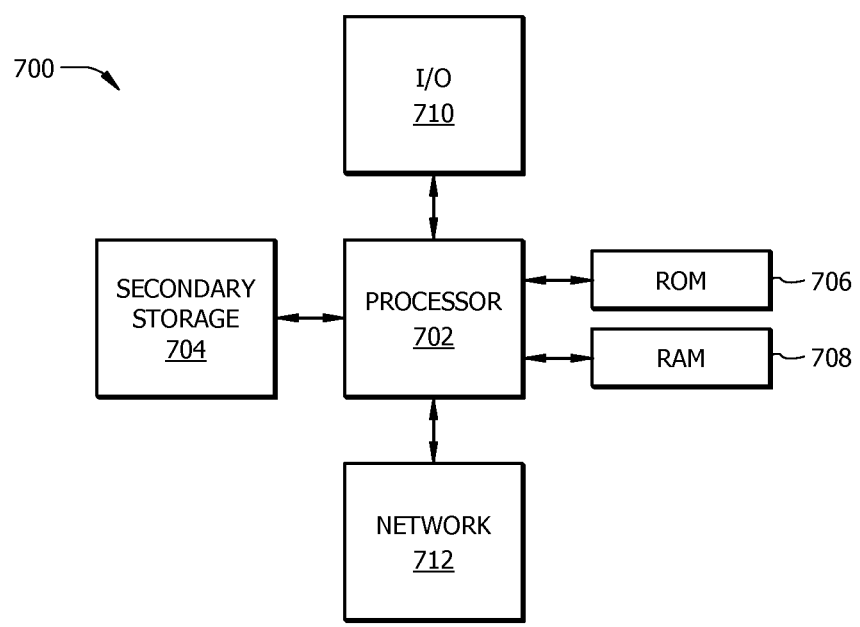
FIG. 7 is a schematic diagram of one embodiment of a general-purpose computer system suitable for implementing the several embodiments of the disclosure.

FIG. 7 illustrates a typical, general-purpose network component 700 that may correspond to or may be part of the nodes described herein, such as a server, a switch, a router, or any other network nodes. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The general-purpose network component 700 may also comprise, at the processor 702 and or any of the other components of the general-purpose network component 700.

The processor 702 may be implemented as one or more general-purpose CPU chips, or may be part of one or more application specific integrated circuits (ASICs) and/or digital signal processors (DSPs). The processor 702 may comprise a central processor unit or CPU. The processor 702 may be implemented as one or more CPU chips. The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An integrated edge node for performing routing functions and network appliance services at the edge of a network, comprising:
 a plurality of ports; and
 a processor operably coupled to the ports and configured to:

detach a plurality of network features from the plurality of ports, wherein the network features include an Access Control List (ACL), Quality of Service (QoS), Internet Protocol Security (IPsec), accounting, deep packet inspection (DPI), and tunneling;

create a plurality of first internal virtual ports associated with a plurality of internal components within the integrated edge node, wherein any of the plurality of first internal virtual ports is able to be associated with any of the internal components;

construct an internal topology of the integrated edge node by linking the first internal virtual ports amongst each other, wherein the internal topology is constructed based on the internal components specified by an operator of the entire integrated edge node such that the internal topology may be dynamically modified when new internal components are added to the integrated edge node or existing internal components are removed from the integrated edge node;

construct an internal path using the internal topology; and associate a first network feature to the internal path.

2. The integrated edge node of claim 1, wherein the processor is further configured to assign an enforcement point for the first network feature along any point of the internal path and modify the internal topology when a new internal component is added to the integrated edge node, and wherein the operator is the only operator of the integrated edge node.

3. The integrated edge node of claim 2, wherein the processor is further configured to create a plurality of second internal virtual ports associated with the new internal component, and modify the internal topology by linking the second internal virtual ports with the first internal virtual ports.

4. The integrated edge node of claim 2, wherein a first internal component from the plurality of internal components provides an appliance service, wherein the appliance service includes a firewall, a Wide Area Application Services (WAAS), an Active Directory, and load balancing, wherein the enforcement point for the first network feature is located at one of the internal virtual ports associated with the first internal component, and wherein any of the plurality of internal components is able to perform any of the appliance services.

5. The integrated edge node of claim 2, wherein the processor is further configured to determine the enforcement point for the first network feature based on a predefined rule associated with a first internal component.

6. The integrated edge node of claim 2, wherein the processor is further configured to determine the enforcement point for the first network feature based on a rule managed by a network administrator.

7. The integrated edge node of claim 2, wherein a first internal component from the plurality of internal components provides a routing function, wherein a second internal component from the plurality of internal components is a physical port, and wherein the enforcement point for the first network feature is not located at one of the internal virtual ports associated with the first internal component and linked to the second internal component.

8. The integrated edge node of claim 1, wherein a first internal component from the plurality of internal components is a first port, wherein a second internal component from the plurality of internal components provides an appliance service, wherein the appliance service includes a firewall, a Wide Area Application Services (WAAS), an Active Directory, and load balancing, and wherein the first internal component is linked to one of the internal virtual ports associated with the second internal component.

9. The integrated edge node of claim 8, wherein a third internal component from the plurality of internal components is a second port, wherein a fourth internal component from the plurality of internal components provides the routing functions, and wherein the third internal component is linked to one of the internal virtual ports associated with the fourth internal component.

10. The integrated edge node of claim 1, wherein the processor is further configured to associate a second network feature to the internal path.

11. The integrated edge node of claim 1, wherein the processor is further configured to assign different enforcement points for the first network feature and the second network feature along the internal path.

12. An integrated edge node for performing routing functions and network appliance services at the edge of a network, comprising;

a first network appliance component configured to provide a network appliance service, wherein the appliance service includes a firewall, a Wide Area Application Services (WAAS), and Active Directory, and load balancing;

a plurality of first internal virtual ports associated with the first network appliance component;

a core unit component associated with the first network appliance component and configured to provide a routing function;

a plurality of second internal virtual ports associated with the core unit component; and a plurality of ports associated with the first network appliance component and the core unit component, wherein the plurality of first internal virtual ports, the plurality of second internal virtual ports, and the plurality of ports are mapped to each other to interconnect the first network appliance component, the core unit component, and the plurality of ports to generate an internal topology, wherein the first network appliance component, the core unit component, and the plurality of ports are specified and controlled by an operator of the entire integrated edge node such that the internal topology may be dynamically modified when new internal components are added to the integrated edge node or existing internal components are removed from the integrated edge node, wherein a first network feature is decoupled from a first port, wherein the first network feature is selected from a group including an Access Control List (ACL), Quality of Service (QoS), Internet Protocol Security (IPsec), accounting, deep packet inspection (DP1), and tunneling, wherein the first network feature is associated with an internal path, wherein the internal path overlaps at least one port, at least one virtual port, the first network appliance component, and the core unit component, and wherein any of the plurality of first internal virtual ports is able to be associated with any of the first network features.

13. The integrated edge node of claim 12, wherein the plurality of ports are coupled to the first network appliance component, wherein the first network appliance component is coupled to the core unit component such that the first network appliance component is positioned between the plurality of ports and the core unit component, and wherein the operator is the only operator of the integrated edge node.

14. The integrated edge node of claim 12, wherein a plurality of third internal virtual ports associated with a second network appliance component is added to the integrated edge node, and wherein the plurality of first internal virtual ports, the plurality of second internal virtual ports, the plurality of third internal virtual ports, and the plurality of ports are mapped to each other.

15. The integrated edge node of claim 14, wherein the first network appliance component is coupled to the second network appliance component, and wherein the second network appliance component is coupled to the core unit component such that the second network appliance component is positioned between the first network appliance component and the core unit component.

16. The integrated edge node of claim 14, wherein the first network appliance component is coupled to the core unit component, and wherein the core unit component is coupled to the second network appliance component such that the core unit component is positioned between the first network appliance component and the second network appliance component.

17. A method implemented in an integrated edge node for performing routing functions and network appliance services at the edge of a network, the method comprising:
  disassociating a first network feature from a port, wherein the first network feature is selected from a group including an Access Control List (ACL), Quality of Service (QoS), Internet Protocol Security (IPsec), accounting, deep packet inspection (DPI), and tunneling;
  creating a plurality of first internal virtual ports;
  associating the plurality of first internal virtual ports to a first network appliance service component and a core unit component, wherein the core unit component is configured to provide a routing function;
  mapping the plurality of first internal virtual ports to each other and to a plurality of ports to construct an internal topology, wherein the internal topology is constructed based on which internal components were specified by an operator of the entire integrated edge node such that the internal topology may be dynamically modified when new internal components arc added to the integrated edge node or existing internal components are removed from the integrated edge node, and wherein any of the plurality of first internal virtual ports is able to be associated with any of the internal components;
  constructing an internal path comprising at least one port, a subset of the plurality of internal virtual ports, the network appliance service component, and the core unit component based on the internal topology; and
  associating the first network feature to the internal path, wherein the network appliance services include a firewall, a Wide Area Application Services (WAAS), an Active Directory, and load balancing.

18. The method of claim 17, wherein the method further comprises:
  creating a plurality of second internal virtual ports;
  associating the plurality of second internal virtual ports to a second network appliance service component; and
  mapping the plurality of first internal virtual ports to the plurality of the second internal virtual ports.

19. The method of claim 17, wherein the first network feature provides deep packet inspection (DPI), wherein an enforcement point is implemented before providing a network appliance service, wherein a second network feature is associated with the internal path, wherein the second network feature is provided after the network appliance service.

20. The method of claim 17, wherein the mapping of the plurality of first internal virtual ports to the plurality of ports is a one-to-one ratio, wherein an enforcement point is assigned along any point of the internal path, and wherein the operator is the only operator of the integrated edge node.

* * * * *

UNITED STATES PATENT AND TRADEMARK OFFICE
CERTIFICATE OF CORRECTION

PATENT NO. : 9,762,446 B2  
APPLICATION NO. : 13/730296  
DATED : September 12, 2017  
INVENTOR(S) : Jun Xu et al.

It is certified that error appears in the above-identified patent and that said Letters Patent is hereby corrected as shown below:

On the Title Page

(73) Assignee should read:
Futurewei Technologies, Inc., Plano, TX (US)

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*